Dec. 10, 1940.   P. PIFFATH   2,224,744
IGNITION DEVICE
Filed Feb. 10, 1940
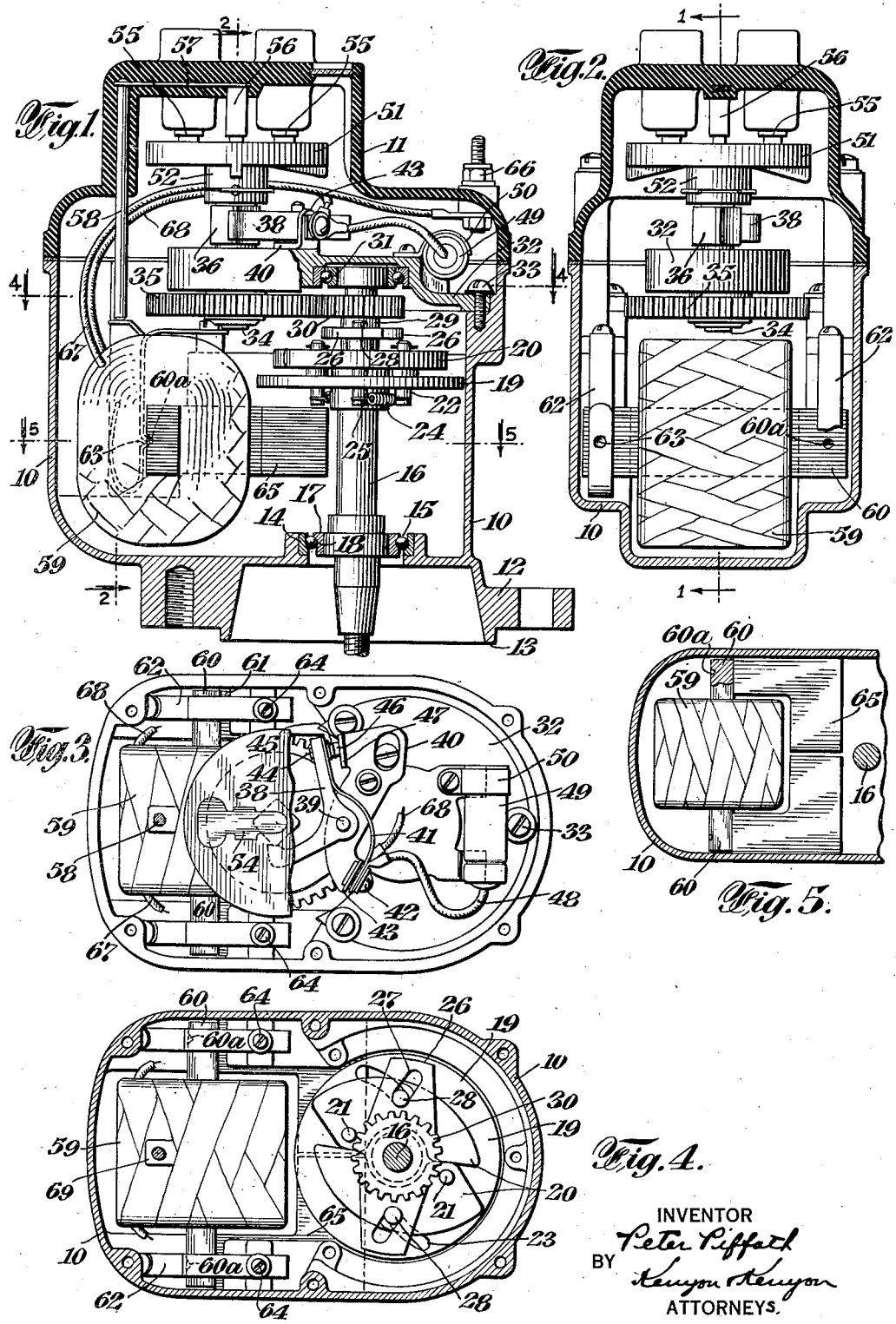
INVENTOR
Peter Piffath
BY
Kenyon & Kenyon
ATTORNEYS.

Patented Dec. 10, 1940

2,224,744

UNITED STATES PATENT OFFICE 2,224,744

IGNITION DEVICE

Peter Piffath, Great Neck, N. Y.

Application February 10, 1940, Serial No. 318,333

13 Claims. (Cl. 123—148)

This invention relates to ignition devices for use in connection with internal combustion engines.

More especially, the invention relates to ignition devices for tractor engines and the like. In general, tractor engines have been designed for equipment with magneto ignition systems in which the magneto armature is coupled directly to the engine crank shaft. There is, however, some demand for tractor engines equipped with battery ignition systems and heretofore it has been thought necessary to change the design of the engine crankcase for engines to be equipped with battery ignition systems instead of magneto ignition systems.

An object of this invention is a combined high tension coil, interrupter and distributor in a single housing of such design and construction that it may be coupled directly to the engine crank shaft without change of design of any part of the engine, the same as heretofore a magneto has been coupled to such shaft. Such a device makes it possible to assemble an engine with either magneto or battery ignition systems without any change of parts of the engine itself.

A further object of this invention is the provision of means for automatically advancing the operation of the interrupter relative to the engine crank shaft upon increase of speed of said shaft with resulting advance of the timing of the spark at the various spark plugs.

Other objects, novel features and advantages of this invention will become apparent from the following specification and accompanying drawing, wherein:

Fig. 1 is a section through a device embodying the invention, said section being substantially on the line 1—1 of Fig. 2;

Fig. 2 is a section on the line 2—2 of Fig. 1;

Fig. 3 is a plan view with the cover removed;

Fig. 4 is a section on the line 4—4 of Fig. 1, and

Fig. 5 is a fragmentary section on the line 5—5 of Fig. 1.

A casing 10, preferably an aluminum die casting, is provided with a cover or head 11 preferably of molded Bakelite or other similar material. The casing is provided with an attachment flange 12, by means of which it may be bolted to an engine casing, the flange including a circular rib 13. An aperture is provided in the casing concentric with the rib 13 and its wall is shaped to receive a ball raceway 14 in which are arranged the bearing balls 15.

A shaft 16 is provided with a collar 17 having a raceway 18 in which are received the bearing balls 15 to journal the shaft 16 in the casing. The end of the shaft 16 projects beyond the rib 13 and is adapted for attachment to a suitable coupling member (not shown), by means of which the shaft 16 is driven by the engine crank shaft. A metal disk 19 is fixed to the shaft 16 and to the disk are pivotally attached a pair of wings 20, by means of pins 21. The shape of the wings 20 and the arrangement thereof relative to the pins is such that each of the wings tends to swing counterclockwise under the influence of centrifugal force developed upon rotation of the shaft 16. Each of the wings 20 carries a stud 22 which projects through a slot 23 in the disk 19. To the lower end of each stud 22 is attached one end of a spring 24, the other end of which is attached to a post 25 supported by the disk 19. The studs and slots limit the extent of swinging movement of the wings and the springs tend to maintain the wings in their innermost position.

A metal plate 26 is rotatably mounted on the shaft 16 and is provided with slots 27 in each of which is received a pin 28 carried by a wing 20. The plate 26 is equipped with a hub 29 to which is fixed a gear 30, and which is provided with a raceway receiving the balls 31 of a ball bearing. The orientation of the gear 30 relative to the shaft 16 is determined by the position of the wings 20.

A plate 32 rests on a shoulder provided in the upper portion of the casing 10 and is held in place by bolts 33. The plate is offset upwardly to provide a recess in which is received a raceway for the bearing balls 31 to journal the upper end of the shaft 16. In the plate 32 is journalled a shaft 34, to the lower end of which is attached a gear 35 which meshes with the gear 30. The shaft 34 is provided with flat portions 36 constituting cam lobes.

A bell crank lever 38 of insulating material is pivotally supported at its elbow by the pin 39 carried by a bracket 40 supported by the plate 32. A leaf spring 41 is attached at one end by a bolt 42 to an ear 43 extending upwardly from the bracket 40, an insulating washer being provided to insulate the spring from the ear. The remaining end of the spring 41 is attached to one end of the bell crank lever 38 by a rivet 44, the tension exerted by the spring being such as to urge said end of the bell crank lever toward the shaft 34 for engagement with the cam portion thereof.

A contact 45 is supported by the rivet 44 for movement into and out of engagement with a contact 46 carried by an ear 47 extending upwardly from the bracket 40. An insulated conductor 48 is attached at one end to the spring 41 by the bolt 42 and is connected at its other end to the center terminal of a condenser 49. The outer terminal or case of the condenser is attached by a bracket 50 to the plate 32.

A disk 51 of insulating material has a hub 52 which fits over the end of the shaft 34 and is held in place by a pin 53. Embedded in the upper face of the disk 51 is a radially extending metal strip or contact arm 54, the inner end of which extends slightly beyond the center of the disk. In the cover 11 are provided a plurality of contacts 55 arranged for successive engagement by the strip 54 upon rotation of the disk 51. The cover also carries a spring-pressed contact 56 which permanently engages the inner end of the strip 54. One end of the contact 56 is embedded in the cover 11 and is connected by a metal bar 57 embedded in the cap to a metal rod 58, one end of which is embedded in said cover and the other end of which extends into the casing.

An induction coil 59 has an iron core 60 which rests against a pair of vertical shoulders 61 formed in the casing wall. The core is held against the shoulders by means of spring clips 62 having projections 63 sitting in recesses 60a in the core. One end of each spring is attached to an abutment in the casing by a bolt 64, the arrangement being such that the spring exerts the necessary pressure to hold the core and its surrounding coil in proper position. The L-shaped iron members 65 each have one leg embedded in the casing wall in such manner that the two remaining legs project toward each other in alinement parallel to the core 60 and the ends of the embedded legs contact the core ends. The ends of the inwardly projecting legs are slightly spaced to provide a narrow air gap. The two members 65 make up an element to co-operate with the core 60 to form a magnetic flux path thus controlling the flow of the magnetic flux.

In the cover 41 is provided a terminal 66 for attachment by means of a suitable conductor (not shown) with the terminal of a battery (not shown). One end of the primary winding of coil 59 is connected through an insulated conductor 67 with the terminal 66 and the other end of said primary winding is connected through an insulated conductor 68 to the spring 41. One end of the secondary winding of the coil 59 is provided with a terminal 69 which extends from the coil in position to be engaged by the lower end of the rod 58 to provide a path for the high tension current from the coil to the contact 56. The other end of the secondary winding is connected with one end of the primary winding to the conductor 67. The outer terminal of the condenser 49 and the contact 46 are grounded through the bracket 40 and wall of the casing 10.

Rotation of the shaft 16 effects rotation of the cam shaft 34 through the intermediary of the gears 30 and 35, the gear ratio being one to two, so that the cam shaft rotates at half the speed of the shaft 16. The cam shaft operates the bell crank lever 38 to open and close the primary circuit of the coil 59 in the usual manner, thereby causing the induction of high tension current in the coil secondary which is supplied to the spark plugs through the contacts 55 and 56 in the usual manner. Rotation of the shaft 16 develops centrifugal force in the wings 20 tending to move them from their inner to their outer position, such movement, however, being prevented by the springs 24 until such time as sufficient centrifugal force is developed to overcome the effect of the springs. After the development of a certain amount of centrifugal force, the wings begin to swing toward their outer position and will reach such position upon attainment by the shaft 16 of a predetermined speed. Such movement of the wings causes rotary movement of the plate 32 and gear 35 relative to the shaft 16 with corresponding advancement of the cam shaft 34 relative to the shaft 16. The timing of the operation of the interrupter relative to the engine crank shaft is thus advanced with consequent advancement of the timing of the spark at the spark plugs.

Preferably, the two members 65 are mounted in the casing by being cast therein when the casing is constructed. However, it is contemplated that the members 65 may be otherwise mounted. Further, it is to be understood that various modifications may be made in the construction above described, without in any way departing from the spirit of the invention as defined in the appended claims.

I claim:

1. A device of the character described comprising a casing composed of metal of low magnetic permeability, an induction coil in said casing, a core therefor, an element of high magnetic permeability carried by the casing wall and co-operating with said core to form a closed magnetic flux path, an interrupter for the primary circuit of said coil within said casing, a rotatable interrupter operating member within said casing, a rotatable distributor in said casing driven by said member, and means connecting the secondary circuit of said coil to said distributor.

2. A device according to claim 1 in which said casing is composed of die cast aluminum and said element is composed of iron with portions thereof embedded in the casing wall.

3. In a device of the character described, a rotatable shaft, a disk fixed to said shaft, wings pivoted to said disk for swinging movement by centrifugal force, resilient means opposing such movement, a plate rotatably mounted on said shaft and having a pair of non-radial slots, a pin on each wing projecting into a slot, a gear rotatable with said plate, a second gear meshing with said first gear, a shaft rotatable with said second gear and having cam faces, and a circuit interrupter having an arm contacting said cam faces.

4. A device of the character described comprising a casing, an induction coil supported in said casing, an interrupter in circuit with the primary winding of said coil, a shaft having a cam for operating said interrupter, a contact arm rotatable with said shaft, means connecting said contact arm in circuit with the secondary winding of said coil, a second shaft, intermeshing gears attached to said shafts, and means responsive to the rotational speed of said second shaft for orienting its gear relative thereto.

5. A device of the character described comprising a casing, an induction coil supported in said casing, an interrupter in circuit with the primary winding of said coil, a shaft having a cam for operating said interrupter, a contact arm rotatable with said shaft, means connecting said contact arm in circuit with the secondary winding of said coil, a second shaft, a gear fixed to said cam shaft, a second gear rotatably supported by said second shaft in mesh with said first gear, a plate fixed to said second gear, a disk fixed to said second shaft, wings pivoted to said disk for movement under the influence of centrifugal force, and interconnecting means between said wings and plate for effecting rotation of said second gear and said second shaft upon swinging movement of said wings.

6. A device of the character described comprising a casing, an induction coil supported in said casing, an interrupter in circuit with the primary winding of said coil, a shaft having a cam for operating said interrupter, a contact arm rotatable with said shaft, means connecting said contact arm in circuit with the secondary winding of said coil, a second shaft, a gear fixed to said cam shaft, a second gear rotatably supported by said second shaft in mesh with said first gear, a plate fixed to said second gear, a disk fixed to said second shaft, wings pivoted to said disk for movement under the influence of centrifugal force, spring means opposing such movement of the wings, and a pin on each wing extending into a slot in said plate.

7. In a device of the character described, a circuit interrupter, a shaft having a cam for operating said interrupter, a second shaft, intermeshing gears attached to said shafts, and means responsive to the rotational speed of said second shaft for orienting its gear relative thereto.

8. In a device of the character described, a circuit interrupter, a shaft having a cam for operating said interrupter, a second shaft, a gear fixed to said cam shaft, a second gear rotatably supported by said second shaft in mesh with said first gear, a disk fixed to said shaft, wings pivoted to said disk for movement under the influence of centrifugal force, and means interconnecting said disks and said second gear for rotating said second gear on said second shaft upon swinging movement of said wings.

9. In a device of the character described, a circuit interrupter, a shaft having a cam for operating said interrupter, a second shaft, a gear fixed to said cam shaft, a second gear rotatably supported by said second shaft in mesh with said first gear, a plate fixed to said gear and having a pair of slots, a disk fixed to said second shaft, wings pivoted to said disk for movement under the influence of centrifugal force, spring means opposing such movement, and a pin on each wing extending into a plate slot.

10. A device of the character described comprising a casing of metal of low magnetic permeability, an induction coil in said casing, a core therefor, two L-shaped members of high magnetic permeability carried by the casing wall, each member having one leg perpendicular to said core with its end contacting the core and the remaining leg parallel to said core with its end slightly spaced from the corresponding end of the other member to provide a narrow air gap, an interrupter for the primary circuit of said coil within said casing, a rotatable interrupter operating member within said casing, a rotatable distributor in said casing driven by said operating member, and means connecting the secondary circuit of said coil to said distributor.

11. A device according to claim 10 in which said casing is composed of die cast aluminum and each L-shaped member is composed of iron with one leg embedded in the casing wall.

12. A device of the character described comprising a casing of non-magnetic metal, an induction coil in said casing, a core for said coil, means supporting the ends of said core from the casing wall, and two L-shaped members of high magnetic permeability carried by the casing wall, each member having one leg perpendicular to said core with its end contacting the core and the remaining leg parallel to said core with its end slightly spaced from the corresponding end of the other member to provide a narrow air gap.

13. A device according to claim 12 in which said casing is composed of die cast aluminum and each L-shaped member is composed of iron with one leg embedded in the casing wall.

PETER PIFFATH.